Patented Aug. 28, 1928.

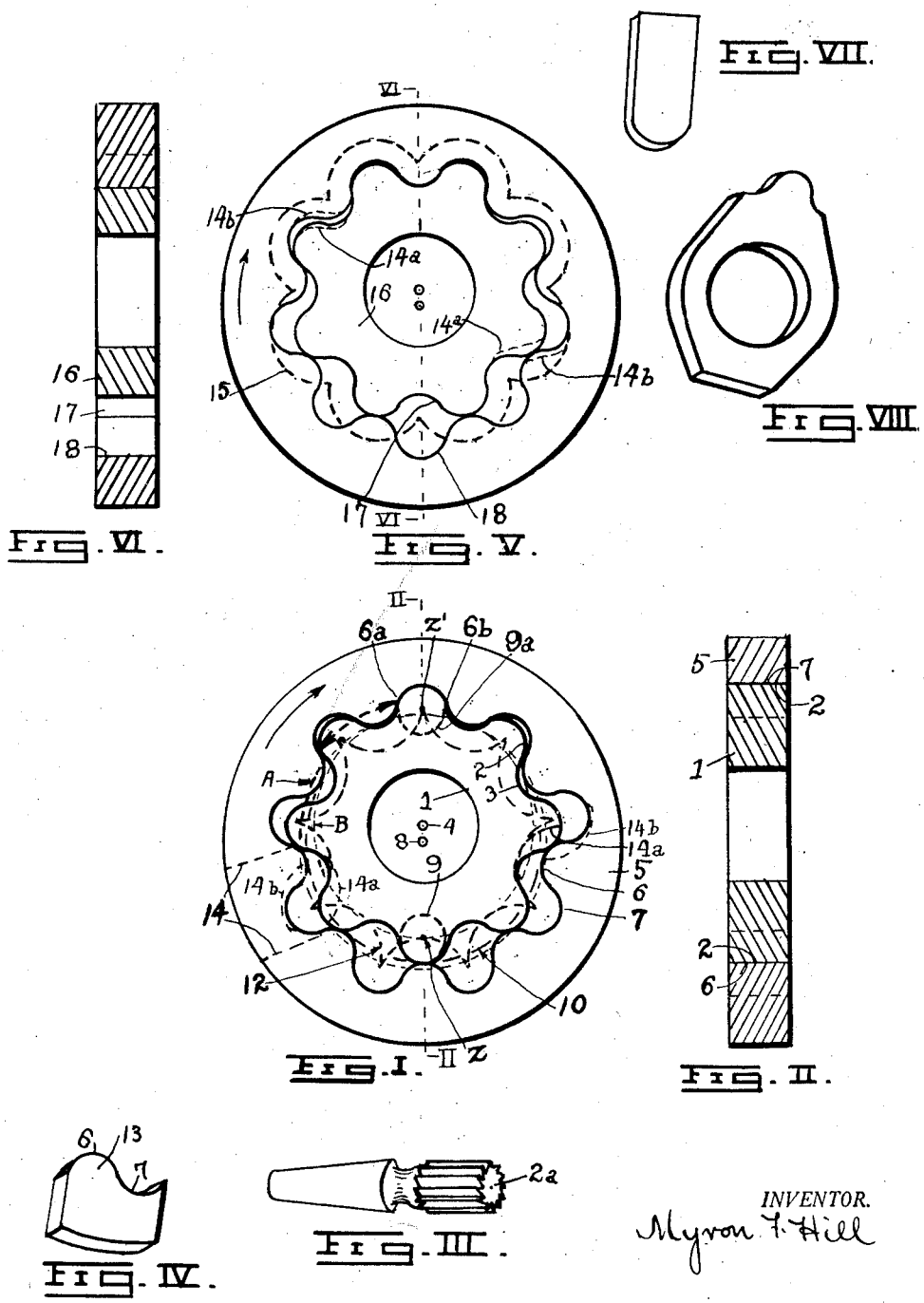

1,682,563

UNITED STATES PATENT OFFICE.

MYRON F. HILL, OF NEW YORK, N. Y.

INTERNAL ROTOR.

Original application filed November 5, 1921, Serial No. 513,075. Divided and this application filed January 14, 1928. Serial No. 246,894.

This case is a division of my application #513,075, filed November 5, 1921; which, as to the invention herein contained, was a continuation of my application #477,494, filed June 14, 1921.

My invention relates to internal rotors; that is, two gears, one within another, having tooth divisions, one having one less tooth division than the other and the teeth of each continuously sliding in contact over the contour of the other.

In general, the method is put into effect, after selecting sizes of pitch circles proportional to the number of rotor teeth, and the size and form of a master tooth or tool form, by mounting the master tool upon means to revolve it around one base or pitch circle while it cuts a blank rotating about the center of the other pitch circle, at a relative speed, properly proportional without variation to the numbers of teeth. This generates one rotor.

A mating tool having one tooth division or a convex tooth form, is then generated in the same way, and the same process applied to the other rotor; the mating tool during its cutting operation being rotated around the center of the rotor already formed, so that it follows the path of a tooth of that rotor and cutting in each successive position a contour on a blank for the other or mating rotor, rotating on its axis at proper relative speed. The convex tooth curves of this mating rotor were assumed as the master form but the tooth spaces were not known and had to be thus generated.

In other words the contours have geometrical outlines produced by three elements, namely two rolling circles and a master curve assisted by a fourth derivative element, a mating curve.

Let two circles be located upon a plane, one within the other and tangent to it. Let their diameters be in proportion to the numbers of tooth divisions selected for the two rotors which should differ by one. A master curve to represent the desired tooth form of a rotor (either rotor) is selected to start the curve generation with and located upon the radius of the circle representing that rotor whose tooth form is so selected.

If the master curve (or the mating curve) is located upon the radius of the inner circle it should have convexity upon its outer side and if located upon the radius of the outer circle it should have convexity upon its inner side. One circle is rolled with the other without slip at the point of tangency which results in steady angular motion of one with relation to the other determined by their relative diameters or in the inverse ratio of the numbers of tooth divisions, and the curved form traced in all the successive positions which it assumes with relation to the other circle, and a curve then drawn along the crests of the traced curves as a curve of envelopment which is the contour that is sought for one rotor element. A portion of the contour, which may be called the mating curve is then carried by the radius of the other circle, as the rolling action is continued in the same way, and its form in every successive position with relation to the first circle is traced; and a curve of envelopment is drawn along the crests of the curves so traced. This latter curve is the contour of the other rotor element.

Applying this description now to the specific embodiment of my invention, the master curve selected is a smaller circle, or portion of its periphery, representing the addendum or convex crown of a tooth of the inner rotor. It is located upon the radius of the inner rolling circle with the center of the arc on or outside the periphery, depending upon its size and shape, with the master curve outside of the center. The two circles, with the radius of the inner circle carrying this master curve, are then rolled, one with the other and the position of this arc traced in each successive position which it assumes with relation to the other circle. This inner circle may rotate nine times while the outer circle rotates eight times or at speeds inversely proportional to the numbers of teeth selected. This relative speed not being varied has a steady angular motion. The contour or outline of the nine tooth rotor, the outer rotor, is the curve of envelopment traced along the crests of these traced curves.

A portion of this curve of envelopment, having a convex side toward the center of the rolling circle is then the "mating curve". It comprises the entire convex portion of a tooth division. It is located upon the radius of the outer circle in its outlined or generated position and the two rolling circles again rolled in the same way and the mating curve is traced in all its successive positions with relation to the inner circle. If the outer circle rotates eight times the inner circle rotates nine times, thus rotating at speeds inversely proportional to the numbers of tooth divisions of the two rotors. A curve of envelopment is then drawn thru the crests of these traced curves which is the contour or outline of the inner rotor element. Such rotors cooperate in the manner specified.

A convenient method of laying out these curves is to mount the describing curve—either the master curve or mating curve—upon an arm which is swung around the center of the circle to which it belongs and rotate a blank around the center of the other circle and trace upon the blank the describing curve in all the successive positions which it assumes, the arm and the blank rotating upon their centers at speeds inversely proportional to the numbers of tooth divisions of the rotors.

Instead of rolling both circles, one circle may remain stationary and the other rolled in or on it as the case may be, always maintaining the point of tangency without slip. This is equivalent to mounting the circles upon a plane rotating backward as fast as one of the circles rotates forward, thus neutralizing its motion. Nevertheless with relation to such a plane their speeds still vary in inverse ratio, or inversely proportional to the numbers of tooth divisions of the rotor elements.

In the mechanical operation of making rotors, the two rolling circles mentioned are the base or pitch circles of the actual rotors which vary in diameter in proportion to the numbers of tooth divisions. The master curve selected is the form of a milling cutter having cutting teeth upon its outer diameter. The mating curve has the characteristic of the convex portion of the tooth of the outer rotor, and its generated position on the base circle. The two base circles and the master milling cutter determine the contour of the outer rotor and therefore the mating curve. That is, the mating curve is determined by those three elements.

The mating curve may have a variety of dimensions.

A blank for the outer rotor is selected with a hole in it to clear the tooth positions, so that there is material from which to form the teeth. It may be mounted in a milling machine in which the milling cutter is carried upon a fixed axis, which corresponds to holding the inner base circle in fixed position, as above described. The mechanic is supplied with figures to shift the table vertically and horizontally between cuts so that with relation to the blank the milling cutter follows the successive positions of a tooth of the inner rotor. When both circles rotate the axis of the milling cutter rotates around the pinion axis as the blank rotates around the other axis. But when the inner circle is fixed the pinion axis is also fixed and the blank rotates on its axis and the axis of the blank rotates around the pinion axis. In either case the resulting curve is the same as hereinbefore described. If the rotors are of the size shown in the drawings, twenty successive cuts from the top of a tooth to the bottom of the next tooth space, repeated for all the other teeth and tooth spaces; and twenty cuts from this bottom position of a tooth space to the top of the next tooth similarly repeated will form the contour of the outer rotor. The surfaces have minute serrations which are removed by wearing the rotor into its mate.

The mating rotor, the pinion, is then to be formed. A shaping cutter or "mating" tool is then made having the contour of the convex portion of the tooth form of the outer rotor and mounted in a so called "shaper", and a blank slightly larger than the outside diameter of the pinion or inner rotor is mounted on the table of the "shaper". The mechanic is supplied with figures for rotating the blank by means of an index, and figures for setting the table in a series of horizontal and vertical positions and in each position the mating tool cuts the blank. Such positions are the positions of the tooth form of the outer rotor with relation to the contour of the inner rotor. Twenty such positions from the top of a tooth of the inner rotor to the bottom of the next tooth space and twenty more from that point to the top of the next tooth, repeated for all teeth and tooth spaces, provide the contour or outline of the inner rotor. This method corresponds to the geometrical description above noted in which the inner circle is held stationary and the outer circle rolled upon it without slip at the point of tangency. The tables of the machine employed for generation as in a milling machine or shaper are supplied with micrometer divisions on the screws that adjust them, so that accurate settings are possible. A milling machine may be used for the master tool and a shaper for the mating tool.

It is apparent to a mechanic that rotors so made fit so tightly one within the other that rotation is difficult, and one rotor has been worn into the other by an operation which may be called "burnishing" which wears off the minute serrations between the cuts so that the rotors work freely together and maintain the contacts between their contours in the region of tangency of the base circles which is usually (in gear parlance) termed "full mesh"; and in the region opposite where the base circles are farthest apart usually termed "open mesh"; which are utilized in fluid mechanisms to keep the pressure in one passageway from leaking thru the teeth over into the other passageway. In both full mesh and open mesh regions this contact is travelling and continuous during rotation so that as the teeth shift in their relative positions with each other and the tooth spaces they do not recede from each other at points which would permit a substantial dissipation of pressure from a high pressure passageway over into a low pressure passageway. My contours with their steady angular velocities maintain fluid tightness in these regions so that high mechanical and volumetric efficiencies are made possible.

Whatever the master curve, and whatever the contour system it creates, this continuous travelling fluid tight relation both at full mesh and open mesh regions is maintained.

If the diameter of the milling cutter is $\frac{7}{16}$ths (of any unit of measurement) its center should lie .023 more or less, outside of the base or pitch circle, when there are eight tooth divisions of the form shown on the inner rotor, and nine tooth divisions on the outer rotor. The base or pitch circles vary as 8 to 9, the inner circle having a radius of 8 units, and the outer a radius of nine units. Their diameters being 16 and 18 units respectively, which is proportional to the numbers of tooth divisions selected for the rotors.

When one rotor is "burnished" into the other as described, it is apparent that a tooth of one rotor makes such close engagement with the contour of the tooth space of the other rotor in the full mesh region that the travelling engagement substantially preventing leakage is realized, and in use there is always at least one point of contact or engagement of the nature specified between the rotor contours substantially preventing leakage in this region.

If the master form or milling cutter represents the tooth of the outer rotor and the mating curve represents the tooth form of the inner rotor, the inner rotor is of course generated first by the master form and then the mating tool may be also generated so that it has the form of a tooth of the inner rotor and this mating tool then generates the outer rotor by the same method above described.

The two rotors have teeth theoretically always in mesh except where a tooth of one rotor at full mesh leaves one tooth of the other rotor in passing to the next tooth of that rotor.

Various tooth face and flank curves have been proposed in text books for the teeth of gears, one inside of the other. Theoretical limits of ratios of such gears have been referred to including a difference of one tooth. But with such a difference, the gear teeth were truncated or shortened to avoid clash at open mesh and for manufacturing purposes. The tooth and tooth space relation at full mesh was missing because of this truncated form. My mutually generative rotor forms provide continuous contact curves with steady angular velocities between the teeth of either rotor and the teeth and tooth spaces of the other rotor from open mesh to full mesh.

Inventors and patentees, from time to time, have claimed that their rotors had sliding contacts, but failed to show or describe any method to attain such a result, or to define curves that could have it.

In the drawings:—

Fig. I illustrates a pair of rotors and the pathways of the teeth of one with relation to those of the other in the specific curve system illustrated in this figure.

Fig. II is a section of the rotors on line II—II, Fig. I.

Fig. III is a master tool of the form selected for this specific system.

Fig. IV is a mating tool for the same system.

Fig. V illustrates an alternative specific variation of my method.

Fig. VI is a section of the rotors in Fig. V on line VI—VI.

Fig. VII is any form of master tool selected to start with, to generate one rotor with.

Fig. VIII is a mating tool generated by the master tool in Fig. VII, for generating the other rotor with.

One specific form of my method of making rotor curves is as follows:—

A pinion gear or rotor 1, Fig. 1, is provided having teeth 2 and tooth spaces 3, centered upon an axis 4. It is eccentric to and works inside of an annular gear or rotor 5 having teeth 6 and tooth spaces 7 and centered at 8. A tooth and tooth space of a rotor constitute a tooth division though a tooth division may not be limited to this form.

The pinion gear teeth 2 and the annular gear teeth 6 are provided with curves that make possible an engagement theoretically at all points, and in practice during either an opening phase from full mesh to open mesh, or the reverse, depending on whether the pinion gear drives the annular gear or vice versa. The exception to this contact between a given pair of teeth is at full mesh shown at the top of Fig. 1 where, in the particular curve system shown, there is an almost instantaneous shift of the contact of a pinion tooth, from one annular gear tooth 6ᵃ to the next one 6ᵇ, at which time, with perfect curves, the pinion tooth barely touches the annular tooth space in passing. Such an annular tooth, on the contrary, takes time to roll on a pinion tooth space as it crosses full mesh, passing from one pinion tooth to the next one.

A pinion tooth 2 travels over an annular tooth's division 6, 7, during one complete rotation about the pinion axis. These specific tooth and tooth space relations in Fig. 1 may be secured by providing the pinion teeth with convex surfaces of substantially circular form.

In designing rotors, the eccentric rotor axes are of course, located with proper pitch circles, upon which the gears are designed, touching at one point, as in ordinary gear design, and proportioned to the numbers of teeth selected. A milling cutter of an approved size is selected as a master tool to cut either rotor with.

In the particular curve system shown in Fig. I, the master tool milling cutter 2ᵃ (Fig. III) is adapted to cut the teeth 6 and tooth spaces 7 of the annular gear or rotor 5. The milling cutter is started rotating at cutting speed in the position of a tooth of the pinion as indicated at 9 for example; an annular blank being provided having a hole indicated in broken lines 10. (Other places may be used for starting the milling operation such, for example, as drilling a hole in some tooth position—9ᵃ for example, where the mill may start cutting the curve, and entering the mill into the hole.) The mill is then rotated at cutting speed upon its axis $z$, in the position of the tooth of the pinion 1, with the axis $z$ lying outside of the pinion base circle B, and revolved around the pinion axis 4 while rotating the annular gear blank around its eccentric axis 8. If the speed of rotation of the mill around the pinion axis—the same as a pinion tooth around that axis—and of the gear blank around its axis vary for instance, as 9 to 8 respectively, the gear blank after nine such rotations, will have nine teeth. A pinion having teeth with convex curves corresponding to the mill in form and size, will rotate harmoniously, with the annular gear so generated,—in other words, at steady angular velocities—so far as the pinion convex tooth contours are concerned. The pinion tooth spaces remain to be determined.

The annular surface thus has generated curves 6, 7, parallel to hypocycloids, or rather to a variety of hypocycloids termed curtate trochoids, shown at 12, the axes of the pinion teeth and mill describing such curves. I term these trochoids "circroids" and the rotor contours in Figs. 1 "phydocroids" (see "Kinematics of Gerotors" by the applicant on file in the U. S. Patent Office Library and elsewhere).

Any other plurality of teeth may be used provided the outer or annular gear or rotor has one more tooth division than the pinion.

Such a pinion 1 should have the convex surfaces of its teeth 2 provided with substantially the same radius of curvature as that of the milling cutter.

The spaces between the pinion teeth may in turn be generated by means of a shaping tool having the form of a tooth space and tooth of the annular gear. A blank of tool steel may be substituted for the rotor blank 5 of the same size and shape and a single tooth 6 and tooth space 7, generated in the same way as the annular gear blank; and the mating tool 13, Fig. IV, cut out of said blank as indicated at broken lines 14, Fig. 1. The convex curve of such a mating tool is not circular when the master tool is circular. The tool 13, or rather its convex portion, generates curves on the pinion that mate with the annular gear. This mating tool is rocked, preferably between cuts, about the pinion blank to assume the various positions that a tooth and tooth space of the annular gear assume about a pinion. The convex portion of the mating tool, during this operation, generates a tooth space 3, and may in practice generate the whole pinion curve tho the convex pinion curves 2 were fixed by selecting the size of the mill and locating it at the point $z$. The number of pinion teeth, too, were assumed to start with.

The axis $z$ of the master milling cutter and of the pinion tooth should be just enough outside of the pitch circle to form the good working curve above described.

And the mating cutter representing the curve of an annular tooth and tooth space if desired (mounted in a shaper machine for example) to shape the pinion teeth and tooth spaces, generates the pinion blank is caused to assume the positions relative to the mating cutter curve, that the corresponding portions of the pinion curve assume to the corresponding portions of the annular gear curve (or one of its teeth).

To sum up this mutually generative relation, the teeth and tooth spaces of either gear or rotor may be generated from the form of teeth of the other, and tooth spaces (and whole contour) of the other gear or rotor may be generated from the form of the teeth of the first gear or rotor to be generated.

Variations of my method, lying within its scope, are possible. Instead of starting with a circular master tool form representing a tooth of the inner rotor, it may represent the form of an annular tooth division on the outer rotor as illustrated in Fig. V. Various master forms Fig. VI may be employed, such as circular ones or ovals of different forms including cycloids, either a simple cycloid or a trochoid or a curve parallel to a trochoid or other forms. In each case, except with simple cycloids, the distance of its axis $z$ outside of the base circles A, B,—which distance is called the curtate addition—has to be determined. Experiment with different distances soon indicates the best curtate addition, to produce contours with continuous sliding contacts as above described.

Some slight degree of lost motion between a pinion and annular gear is desirable for free action; that is, portions of the courves which have no needed function—as at 14ᵃ on the pinion rotor—or any part of it, and portions at 14ᵇ on the annular rotor, or such parts thereof as are not needed for continuous contact, depending on the application of my invention,—may be varied—that is cut into— if desired, so that, in assembly, one rotor may enter the other freely. This cutting away connects the rotor spaces or chambers together on the non-driving side. My gears may be mounted upon journals, having the usual lost motion in the journals to permit free rotation without injurious heat. When the gears are first assembled on such journals, the pinion teeth at first ride hard upon the annular teeth at open mesh until the teeth wear free and until the gears bear upon their journals instead of upon each other. If the annular gear drives the pinion in the direction of the arrows, the teeth bear against each other from open mesh to full mesh, as on the left side of Fig. 1.

If the pinion gear drives the annular gear when travelling clockwise, they bear on each other on the right side of Fig. 1, from full mesh to open mesh.

Except for the length of a tooth division nearest full mesh the pressure is reduced between the teeth that bear against each other until it is substantially eliminated, and the teeth assume a pressureless sliding contact that keeps them smooth and brightly polished. This action may be termed "burnishing."

The tooth division, indicated by a double headed arrow Fig. 1, at full mesh is the driving range; and if it wears, the sliding contacts elsewhere are again subjected to pressure until they wear free again to new curves. By such an action the gears wear tight. When subjected to heavy emergency loads, these additional gear tooth contacts provide reserve driving strength and load sustaining power, as well as add to their durability. This action between the teeth that keeps them tight regardless of wear is of vital importance in working on or by high pressure fluids. These various tooth contacts, when combined in pumps or engines with ports to match the tooth contact action, provide rotor chambers that open and close and are able to perform expansion and contraction pressure functions, such as pumping fluids, or acting as motors, particularly for gases, with high efficiency, both from a volumetric and power standpoint.

In Fig. V, in which the master tool represents the tooth of an annular rotor, the axis of the master tool, Fig. III or Fig. VII, follows the epicircroid curves shown in broken lines 15, during generation of the contour 17 of rotor 16. The mating tool, Fig. VIII, thereupon represents a tooth of the pinion gear and generates the curve 18 on the outer rotor. When the master tool, Fig. VII, is a simple cycloid, the cycloid is erected on the base circle of the rotor, of which it represents a tooth (see Kinematics supra). In such a case, the generated teeth of the inner rotor are simple epicycloids, and the generated tooth spaces are simple hypocycloids and the generated tooth spaces of the outer rotor are then simple epicycloids, Whatever the master tool curve, in either Fig. 1 or V, the mating tool has a curve determined by the master tool. And the curves of the two rotors are determined by these tools. It therefore follows that all rotor curves are determined by the master tool.

Without limiting my invention to specific proportions, I find the following effective for small rotors of the type shown in Fig. 1. Using one as a standard of measurement, the centers 4 and 8 may be .115 apart. The radius of the base circle A may be .92 and of B 1.035. The curtate addition, the distance of the axis of a pinion tooth—or of the mill—may be located .023, more or less, outside of the base circle A (or less or more) to cut the outer rotor from. The radius of a tooth 2 and of the milling cutter $2^a$ may be .2187. The axis of the tooth 2 and that of the milling cutter describe a star shaped figure of the character shown at 12 in cutting the curve 6, 7.

In this specification and in the claims I have made the statement or used the expression that the curves of envelopment upon or by which the contours of the rotors are formed are generated by the tooth form during "relative angular motions" inversely proportional to the numbers of teeth. I mean to indicate by this expression that altho the two peripheries travel at the same speed at the place where the teeth engage, they necessarily vary in relative angular displacement, moving as they do on different radii and one having one less tooth than the other. In the ratio of 8:9 for example, the larger rotor would not have completed its revolution by 40° when the smaller had made a complete turn. Necessarily this makes the teeth of one slide on the teeth of the other; and it is one of the main objects of my invention to so form the curves of envelopment of the two sets of tooth divisions during the working range (which may be either using or delivering power) that the contours shall continuously maintain travelling contact due to the relative angular displacement specified; on the one hand not permitting any opening or relieving between the tooth divisions of the two rotors thru which anything approaching commercial pressures would be immediately dissipated; and on the other hand maintaining contact substantially as continuously and with substantially as slight friction as between plane surfaces, so that the teeth burnish one another as they engage and part, and can be efficiently lubricated to form a film which is not removed either by the contact of the metal or by fluid pressure. In practice after the teeth have become burnished no substantial lubrication between them is required for tightness.

These proportions may vary of course. If alterations are made in the size of the master tool, its shape, the specific system of generation, or other factors, trial cuts indicate the correct curtate addition to secure the best curves.

While I have described certain specific forms and applications of my invention, it is understood that its scope is not limited to them but embraces such rotor contours as may conform to the structure or utilize the method, or novel aspects of them, herein described.

What I claim is:—

1. A rotary mechanical movement comprising two rotor members having internal and external teeth respectively, one within, eccentric to, and having one less tooth division than the other, each tooth having a radial height from the hollow of a tooth space to the top of a tooth substantially equal to twice said eccentricity and the faces and flanks of the teeth of each rotor having contours generated by the form of the other at steady angular velocity, to provide continuous sliding contacts between the teeth in the open mesh region and the full mesh region.

2. Rotors claimed in claim 1, having said continuous contacts extending from open mesh to full mesh.

3. Rotors claimed in claim 1, having a substantially circular tooth form on one rotor and a contour on the other rotor having a generative relation to said circular tooth form.

4. Rotors claimed in claim 1, having a substantially circular tooth form on the inner rotor and the outer rotor having its contour in generative relation to said tooth form.

5. Rotors claimed in claim 1, having contours unnecessary for continuous contact cut away, to allow free entry of one within the other.

6. Rotors claimed in claim 1, having their contours burnished together to maintain continuous contact and, except for a driving range at full mesh, to eliminate substantial pressure.

Signed at New York, in the county of New York and State of New York, this 9th day of January, A. D. 1928.

MYRON F. HILL.